Patented Dec. 15, 1936

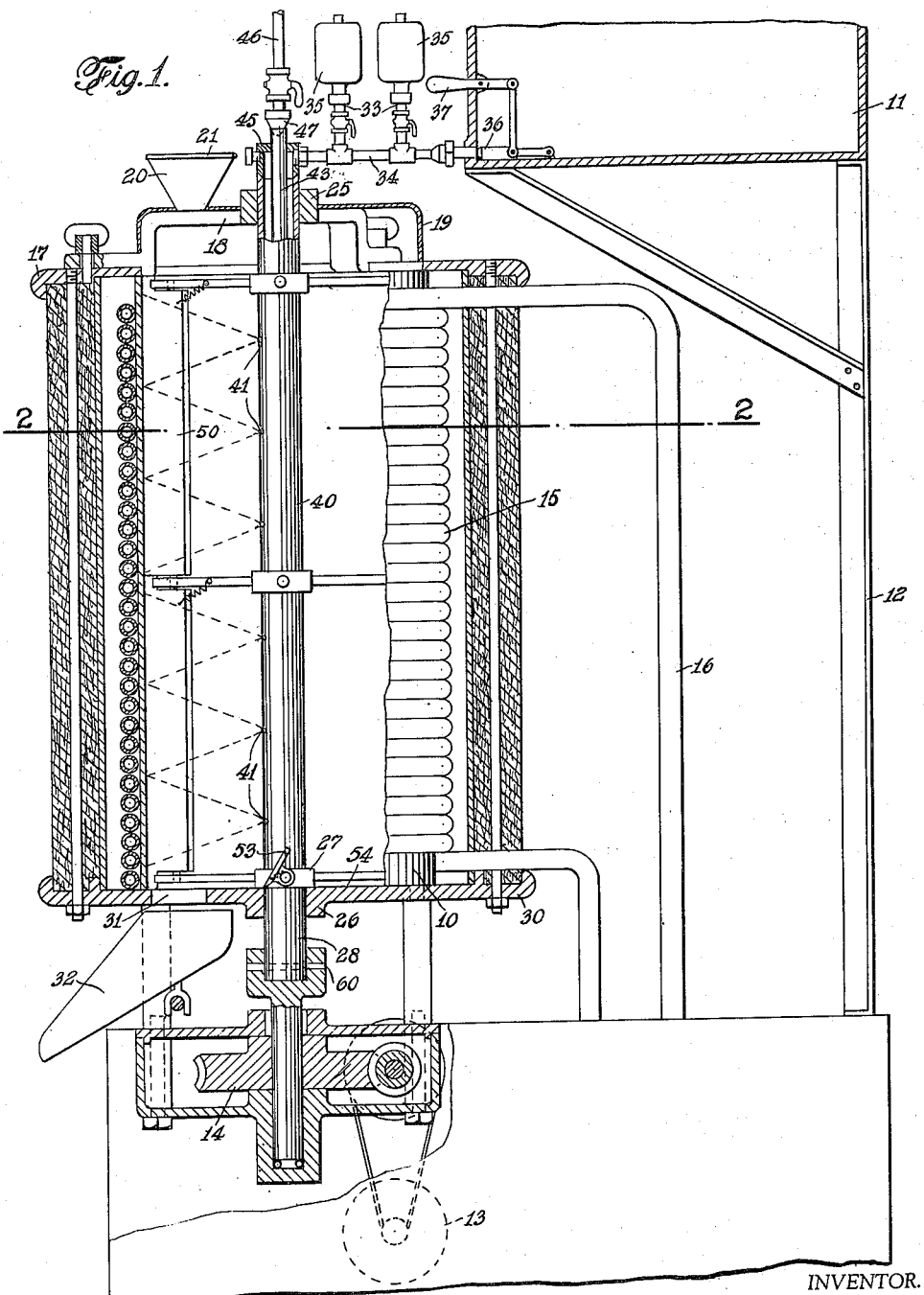

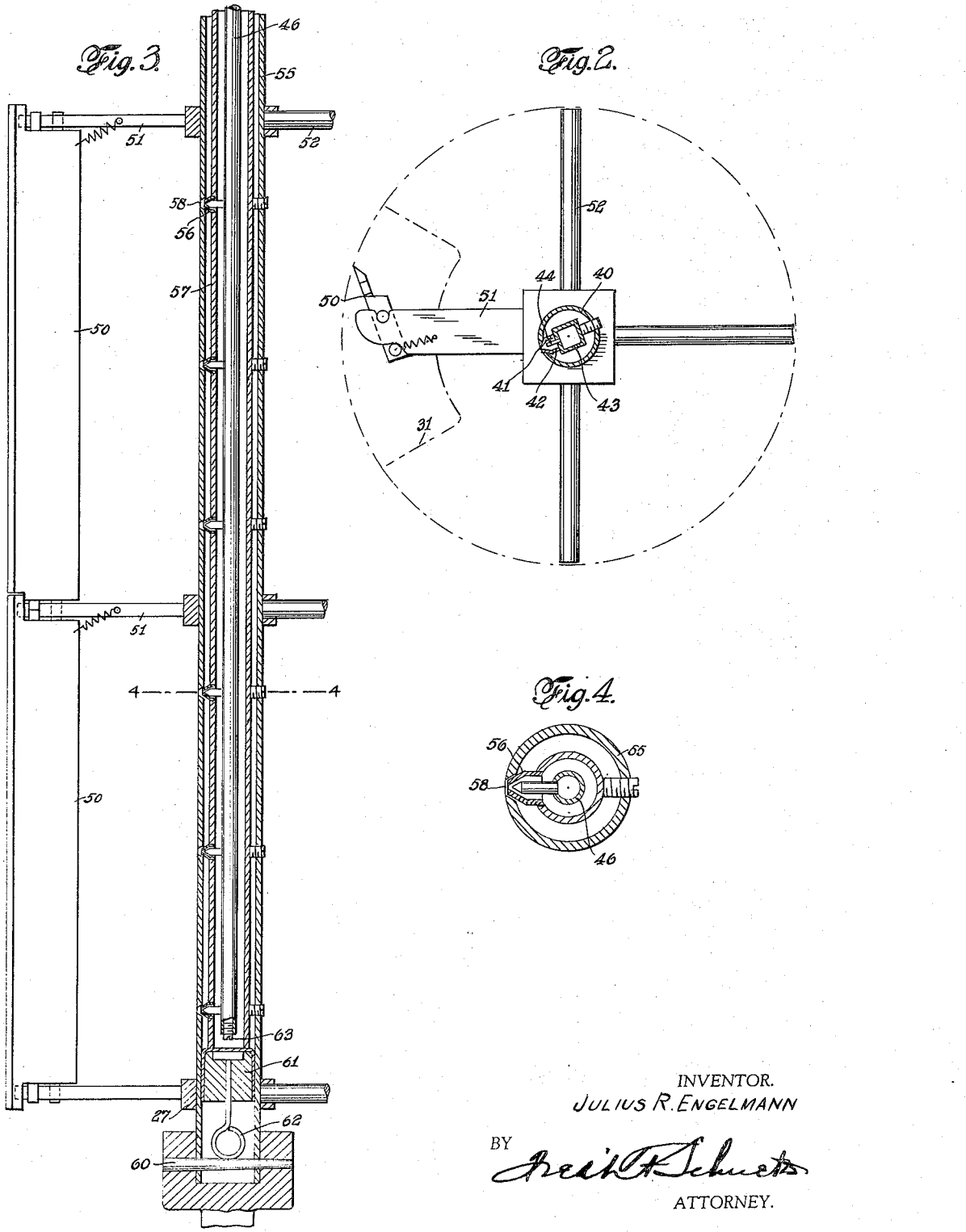

2,064,597

UNITED STATES PATENT OFFICE 2,064,597

FREEZING AND DISPENSING APPARATUS

Julius R. Engelmann, Jersey City, N. J.

Application July 3, 1935, Serial No. 29,636

11 Claims. (Cl. 62—114)

The invention relates to the freezing of edible liquid mixtures, such as ice cream, custards, etc., within, and the dispensing of the same from, apparatus constituting a self-contained unit.

The invention has for an object the provision of apparatus of this nature wherein the freezing of a prepared mix is continuously and rapidly effected together with aeration of the mix so that the frozen product will be particularly fluffy or possess in a high degree so-called "overrun".

Another object of the invention resides in the provision of suitably located distributing means as, for example, a distributor tube for finely dividing the mix and causing it to impinge upon a refrigerating surface for effecting the substantially instantaneous freezing thereof, one of the cooperating elements being movable.

Still another object of the invention resides in the arrangement of the distributor tube with respect to the cooling surface such that the former is readily removable for cleaning and sterilizing, and also an arrangement such as to afford ready access to the cooperating members as for inspection thereof.

A still further object of the invention resides in the provision of means for effecting a continuous feed of mix and discharge of the frozen product.

The invention has for another object the provision of means whereby modifying ingredients, such as flavoring syrups, crushed fruit or nuts and the like may be added during the process and thoroughly incorporated with the mix and/or the frozen product; and to admit of rapid supplying of the same without necessitating the stopping of the machine.

In carrying out the invention, a suitable refrigerating element or freezing surface is provided, for example, as the interior wall of a cylindrical freezing drum and from one end of which is designed to be discharged the frozen product. The mix is received from a suitable storage tank by a distributing element such as a distributor tube from which it is discharged through a multiplicity of orifices under the action of associated air nozzles for impingement against the said surface. One of the cooperating elements may be movable relatively to the other to cause a multiplicity of streams of the mix to be distributed uniformly over fresh portions of the freezing surface. Thus, the said tube may be rotatably mounted within the drum and be driven from suitable motor means which may operate also the refrigerating apparatus for cooling the freezing surface and provide for a supply of air to the nozzles. Or, the said distributing means comprising nozzles may be suitably positioned angularly to cover the freezing surface with atomized mix.

Scraping means for the frozen product may be provided, and in the case of the tubular embodiment are arranged to follow its rotation and to separate from the freezing surface the adherent frozen mix, so that a clean freezing surface will always be presented to a fresh charge of atomized mix which follows the scraping blade closely. The mix is thoroughly aerated and finely subdivided by the action of the air nozzles and will readily and rapidly be frozen on contact with the freezing surface; and the frozen product is mechanically urged or advanced under the action of gravity toward one end of the drum for discharge therefrom.

If desired, provision may be made for introducing into the mix flowing through a supply tube from a storage tank for the mix suitable flavoring syrups or the like; or for introducing directly into the freezing chamber other modifying ingredients such as crushed fruit or crushed nuts. In the latter instance, this may be effected through the provision of a readily accessible lid in a cover for the feed end of the freezing chamber, the material introduced being in both instances subjected to the action of the various discharged streams delivered by the distributor means and thus thoroughly incorporated with the mix and/or frozen product.

The nature of the invention, however, will best be understood when described in connection with the accompanying drawings, in which:

Fig. 1 is a part front elevation and vertical section of the freezing and dispensing apparatus, and illustrates one embodiment of the invention.

Fig. 2 is a horizontal section taken on the line 2—2, Fig. 1 of the drawings.

Fig. 3 is an enlarged vertical section through a modified form of the distributor tube and shows also guide arms and a scraper element carried thereby.

Fig. 4 is an enlarged horizontal section through the modified form of distributor tube and taken on the line 4—4, Fig. 3 of the drawings.

Referring to the drawings, provision is made for a freezing surface, for example, as the interior surface of a drum or cylinder 10 and which, in the embodiment shown, is indicated in an upright position. However, this is not essential as the surface may be at various inclinations to the vertical, as a matter of fact, even assuming a horizontal position which, of course, would require mechanical advancing means for the discharge of the frozen product.

The liquid mix is prepared previously in bulk and may be contained in a supply tank or vat 11 located above the top of cylinder 10 so as to feed by gravity into the distributor member hereinafter described and which, together with the said cylinder and tank, is supported upon a suitable framing 12. This framing may support also a motor 13, and intermediate driving mechanism 14 for rotating distributor means, as well as appurtenant mechanisms such as an air-compressor, refrigerating apparatus, etc., (not shown).

Surrounding the cylinder 10 is a freezing coil 15 for securing the desired reduction in temperature of its inner surface, the refrigerant being introduced thereto through a connecting pipe 16 from suitable refrigerating apparatus (not shown). At the top, cylinder 10 is closed by a suitable annular and removable cover member 17 which closes off the refrigerating portion about the cylinder and includes also a yoke member 18 removably secured thereto and over which is fitted two halves of a closure element 19, preferably carrying a hopper 20 with spring lid 21 and adapted to discharge into the interior of the said cylinder.

In addition, yoke 18 affords a bearing 25 for an axially disposed distributor member comprising a plurality of coaxially mounted tubes. A further bearing 26 is provided at the bottom of the cylinder, a collar 27 being secured to the distributor member at its lower end and rotation being communicated to the distributor member from motor 13 through the transmission mechanism 14 which is pinned to the projecting end 28 of the said distributor member.

The bottom of the cylinder 10 is closed as by a plate 30 save for an arcuate opening 31 serving as a discharge outlet from the interior of the cylinder for the product frozen therein, and the same may be received by a chute 32 or the like for final discharge.

In preparing this product, ingredients or modifying agents additional to the mix may be introduced during the process as in providing a valved inlet or inlets 33. These are vertically connected to the mix-supplying pipe 34 connecting the tank 11 to the distributing means and are designed to receive inverted containers 35, for example, for liquid flavors and the like which drain then into said pipe 34 and continue with the mix into the distributor means. Or, the same may be introduced with the air stream for atomizing the mix, as hereinafter set forth. Furthermore, solid ingredients such as crushed fruit, nuts, etc., may also be introduced into the interior of the cylinder 10 as through the hopper 20, first raising its lid 21. In both instances, the introduced matter will be thoroughly incorporated with the original material when delivered as frozen products and as hereinafter will be more fully set forth. Moreover, when the apparatus is not running continuously, small quantities of the mix itself, and of predetermined amounts if desired, may be introduced through the use of the containers 35.

Control of the outgoing mix from tank 11 is conveniently effected through a manually actuated valve 36 in the bottom thereof, for example, through an operating handle 37 conveniently located at the upper and side portion of the tank.

The distributor means which receives the mix and distributes the same over the freezing surface provided by cylinder 10 is indicated more in detail in Fig. 2. As shown, the distributor member comprises an outer tubular member 40 having a multiplicity of peripheral orifices 41 with inward perforated extensions 42, the outlets being arranged longitudinally of member 40 and preferably equally spaced in accordance with the desired distribution of the mix upon the inner wall of cylinder 10 upon which the mix in finely divided state is designed to impinge, as indicated, and thus be frozen substantially instantaneously and provided in a particularly fluffy state. To this end, the mix is projected through the various orifices under the influence of air under pressure and which is introduced through a centrally located tube 43 coaxial with tube 40 and carrying radial nozzles 44 juxtaposed to the respective orifices 41. The mix is supplied through a suitable coupling 45 from the pipe 34 into the tubular member 40, while the air is obtained from a supply pipe 46 therefor through a coupling 47, and may be first filtered or otherwise conditioned for use. The heads of nozzles 44 are displaced sufficiently from the corresponding orifices 41 to permit flow of the mix thereto, the mix being atomized thereby and projected in this finely-divided condition toward the cylinder wall to be frozen substantially instantaneously as it impinges upon the freezing surface. The degree of atomization is conveniently regulated by suitably adjusting the position of a nozzle outlet with respect to the corresponding orifice, or by controlling the pressure or volume of the air supplied for atomizing.

In this manner, the finely-divided mix is uniformly distributed opposite the orifices over the inner freezing surface of the cylinder 10 as the distributing member rotates; and provision is made for insuring always a clean surface to receive the atomized mix, as, for example, through a longitudinally disposed scraper element 50. This element is pivotally mounted at the outer end of an arm 51 carried by the outer tube 40 which also carries a plurality of guide arms 52 for insuring the central location of the distributor member when inserting the same into the cylinder.

At the bottom of the cylinder 10, provision is made also to insure the discharge of the frozen material scraped from the surface of the cylinder and secure discharge through the outlet 31 into the chute 32. Thus, collar 27 may carry also a radially disposed scraper blade 53 which travels with the tube 40 over the bottom surface 54 of the cylinder.

Figs. 3 and 4 indicate a modification in the distributor member in that the same comprises three tubular members the outer one 55 serving to protect the nozzles 56 of the adjacently and coaxially disposed mix tube 57 against possible freezing shut, there being provided in the said outer member 55 perforations or orifices 58 juxtaposed to said nozzles.

In order that these tubes may readily be cleaned and inspected, provision is made for detaching the distributor member as a whole from the rotating mechanism therefor, as in withdrawing the connecting pin 60 between its lower end and the transmission mechanism 14 and removing the yoke 18 from the top with uncoupling also of the connections between the mix feed pipe 34 and air supply pipe 46 and the distributing member. Furthermore, the lower end of the distributor member may be fully opened for cleansing as in withdrawing a plug 61 (Fig. 3) fitting therein, for example, by means of the finger piece 62 projecting from said plug. If required, a screw plug 63 at the lower end of the air tube may also be removed.

I claim:

1. In apparatus of the character set forth: an element affording a freezing surface adapted to discharge frozen mix, mix-distributor means extending longitudinally with respect to the freezing surface and provided with a plurality of longitudinally disposed discharge openings adapted to deposit simultaneously therefrom mix upon and to distribute the same substantially uniformly over the length of the said surface, means to move one of the associated elements relatively to the other, and air-discharge means associated with the mix-distributor means to discharge the mix forcibly therefrom in a direction substantially normal to the freezing surface, aerate the mix and cause it to be distributed over and to impinge in finely-divided condition as a succession of linear deposits of mix upon the freezing surface for substantially instantaneous freezing of the mix.

2. In apparatus of the character set forth: an element affording a cylindrical freezing drum adapted to discharge frozen mix and having at one end a discharge outlet, a rotatable distributor tube axially mounted within the drum and provided with a plurality of discharge openings adapted to deposit mix therein simultaneously from said openings and substantially uniformly over the length of the inner surface of the drum, means to rotate said tube, and air-discharge means associated with the mix-distributor tube to discharge the mix forcibly therefrom in a direction substantially normal to the wall of the drum, aerate the mix and cause it to be distributed over and to impinge in finely-divided condition as a succession of linear deposits of mix upon the freezing surface of the drum for substantially instantaneous freezing of the mix.

3. In apparatus of the character set forth: an element affording a cylindrical freezing drum adapted to discharge frozen mix and having at one end a discharge outlet, a rotatable distributor tube axially mounted within the drum and provided with a plurality of longitudinally disposed openings adapted to deposit simultaneously therefrom mix therein substantially uniformly over the length of the inner surface of the drum, scraper means carried by said tube for continuously scraping the deposited mix from the inner surface of said drum throughout its length, means to rotate said tube and scraper means simultaneously, and air-discharge means associated with the mix-distributor tube whereby the mix will be forcibly discharged therefrom, aerated and caused to be distributed over and to impinge in finely-divided condition upon the freezing surface of the drum for substantially instantaneous freezing of the mix.

4. In apparatus of the character set forth: an element affording a cylindrical freezing drum adapted to discharge frozen mix and having at one end a discharge outlet, a distributor tube axially mounted in the drum and provided with a multiplicity of longitudinally disposed peripheral discharge orifices for mix, means to introduce the mix into the tube at one end thereof, air-discharge nozzles associated with the respective mix-discharge orifices and means to admit air under pressure to the said nozzles whereby the mix will be forcibly discharged from the said tube, aerated and caused to be distributed over and to impinge in finely-divided condition upon the freezing surface for substantially instantaneous freezing of the mix.

5. In apparatus of the character set forth: an element affording a cylindrical freezing drum adapted to discharge frozen mix and having at one end a discharge outlet, a distributor tube axially mounted in the drum and provided with a multiplicity of longitudinally disposed peripheral discharge orifices for mix, means to introduce the mix into the tube at one end thereof, a longitudinal scraper blade carried by the tube in advance of its discharge orifices and displaced from said tube for engaging the inner surface of said drum, air-discharge nozzles associated with the respective mix-discharge orifices, and means to admit air under pressure to the said nozzles whereby the mix will be forcibly discharged from the said tube, aerated and caused to be distributed over and to impinge in finely-divided condition upon the freezing surface for substantially instantaneous freezing of the mix.

6. In apparatus of the character set forth: an element affording a cylindrical freezing drum adapted to discharge frozen mix and having at one end a discharge outlet, a distributor tube axially mounted in the drum and provided with a multiplicity of longitudinally disposed peripheral discharge orifices for mix, means to introduce the mix into the tube at one end thereof, a removable seal located in the opposite end of the tube, air-discharge nozzles associated with the respective mix-discharge orifices, and means to admit air under pressure to the said nozzles whereby the mix will be forcibly discharged from the said tube, aerated and caused to be distributed over and to impinge in finely-divided condition upon the freezing surface for substantially instantaneous freezing of the mix.

7. In apparatus of the character set forth: an element affording a cylindrical freezing drum adapted to discharge frozen mix and having at one end a discharge outlet, a distributor tube axially mounted in the drum and provided with a multiplicity of longitudinally disposed peripheral discharge orifices for mix, means to introduce the mix into the tube at one end thereof, means communicating with the mix-introducing means for adding thereto modifying ingredients, air-discharge nozzles associated with the respective mix-discharge orifices, and means to admit air under pressure to the said nozzles whereby the mix will be forcibly discharged from the said tube, aerated and caused to be distributed over and to impinge in finely-divided condition upon the freezing surface for substantially instantaneous freezing of the mix.

8. In apparatus of the character set forth: an element affording a cylindrical freezing drum adapted to discharge frozen mix and having at one end a discharge outlet, a distributor tube axially mounted in the drum and provided with a multiplicity of longitudinally disposed peripheral discharge orifices for mix, means to introduce the mix into the tube at one end thereof, valved inlet means communicating with the mix-introducing means for adding thereto modifying ingredients, air-discharge nozzles associated with the respective mix-discharge orifices, and means to admit air under pressure to the said nozzles whereby the mix will be forcibly discharged from the said tube, aerated and caused to be distributed over and to impinge in finely-divided condition upon the freezing surface for substantially instantaneous freezing of the mix.

9. In apparatus of the character set forth: an element affording a cylindrical freezing drum adapted to discharge frozen mix and having at one end a discharge outlet, a distributor tube axially mounted in the drum and provided with a multiplicity of longitudinally disposed peripheral discharge orifices for mix, means to introduce the mix into the tube at one end thereof, valved inlet means communicating with the mix-introducing means for adding thereto modifying ingredients, a feed hopper communicating with the feed end of the drum, air-discharge nozzles associated with the respective mix-discharge orifices, and means to admit air under pressure to the said nozzles whereby the mix will be forcibly discharged from the said tube, aerated and caused to be distributed over and to impinge in finely-divided condition upon the freezing surface for substantially instantaneous freezing of the mix.

10. In apparatus of the character set forth: an element affording a cylindrical freezing drum adapted to discharge frozen mix and having at one end a discharge outlet, a distributor tube axially mounted in the drum and provided with a multiplicity of longitudinally disposed peripheral discharge orifices for mix, an air-supplying tube disposed coaxially within said distributor tube and rotatable with the latter, and nozzles communicating with the air-supplying tube and associated with the respective mix-discharge orifices to forcibly discharge the mix from said distributor tube, aerate the same and cause it to be distributed over and to impinge in finely-divided condition upon the freezing surface for substantially instantaneous freezing of the mix.

11. In apparatus of the character set forth: an element affording a cylindrical freezing drum adapted to discharge frozen mix and having at one end a discharge outlet, a distributor tube axially mounted in the drum and provided with a multiplicity of longitudinally disposed peripheral discharge orifices for mix, an air-supplying tube disposed coaxially within said distributor tube and rotatable with the latter, a further tube surrounding both the mix-supplying tube and the air-supplying tube, rotatable therewith and having orifices aligned with the orifices of the mix-supplying tube, and nozzles communicating with the air-supplying tube and associated with the respective mix-discharge orifices to forcibly discharge the mix from said distributor tube, aerate the same and cause it to be distributed over and to impinge in finely-divided condition upon the freezing surface for substantially instantaneous freezing of the mix.

JULIUS R. ENGELMANN.